ACTUAL WHEEL SPEED α
AND REFERENCE WHEEL
SPEED β

FIG. 4B

BRAKE TORQUE BT AND
TIRE TORQUE TT

FIG. 4C
REDUCTION SIGNAL

FIG. 4D
CONTINUED ACCELERATION
SIGNAL

FIG. 4E
TERMINAL VOLTAGE ACROSS
CAPACITOR 121

FIG. 4F
REFERENCE WHEEL
DECELERATION

ACTUAL WHEEL SPEED α
AND REFERENCE WHEEL
SPEED β

FIG. 6B

BRAKE TORQUE BT AND
TIRE TORQUE TT

FIG. 6C

REDUCTION SIGNAL

FIG. 6D
OUTPUT OF DIFFERENTIAL
CIRCUIT

FIG. 6E
TERMINAL VOLTAGE ACROSS
CAPACITOR 121

FIG. 6F
REFERENCE
WHEEL DECELERATION

FIG. 7A

Vw: ACTUAL WHEEL SPEED VOLTAGE

Va: INPUT TO INPUT TERMINAL 200a OF 2ND DIFFERENTIAL AMPLIFIER 200

Vb: INPUT TO INPUT TERMINAL 200b OF 2ND DIFFERENTIAL AMPLIFIER 200

FIG. 7B

REDUCTION SIGNAL

FIG. 7C

OUTPUT OF 2ND DIFFERENTIAL AMPLIFIER 200

FIG. 7D

OUTPUT OF DIFFERENTIAL CIRCUIT OF CAPACITOR 208 AND RESISTOR 209

United States Patent Office

3,701,569
Patented Oct. 31, 1972

3,701,569
ANTI-SKID SYSTEM FOR VEHICLES
Hiroshi Arai and Akira Nakamura, Toyota, Atutoshi Okamoto, Toyohashi, and Shunji Okumura, Kariya, Japan, assignors to Toyota Jidosha Kogyo Kabushiki Kaisha, Toyota-shi, and Nippondenso Kabushiki Kaisha, Kariya-shi, Japan
Filed Oct. 6, 1970, Ser. No. 78,524
Claims priority, application Japan, Oct. 16, 1969, 44/82,816, 44/82,817
Int. Cl. B60t 8/08
U.S. Cl. 303—21 BE        7 Claims

ABSTRACT OF THE DISCLOSURE

An anti-skid system for vehicles is disclosed having a novel wheel lock detecting apparatus for supplying brake release signals. The exemplary system includes an actual wheel speed voltage generator for generating an actual wheel speed voltage corresponding to an actual wheel speed as well as a reference wheel speed voltage generator for generating a reference wheel speed voltage corresponding to a reference wheel speed. The reference wheel speed voltage exists across a capacitor and decreases with a first discharging time constant value corresponding to a first preset deceleration value. The reference voltage starts discharging from an initial value which is lower than the actual wheel speed voltage when the rate of reduction of actual wheel speed voltage reaches a value corresponding to said first preset deceleration value. A differential amplifier is included for producing an output signal to reduce braking pressure when said reference wheel speed voltage becomes higher than an actual wheel speed voltage. There is also a detector for detecting a predetermined variation in the actual wheel speed voltage during a time starting from the termination of the output signal from said differential amplifier or, in other words, after the brake release signal terminates. A time constant setting device is provided for switching the discharging time constant corresponding to said first preset deceleration value to a second discharging time constant value corresponding to a second preset deceleration value, which is smaller than the first. The switching between first and second discharge time constants is controlled by an output signal of said detector to thereby control the reference wheel speed voltage generator, whereby the wheel lock detecting apparatus accurately detects any tendency of the wheels to lock and produces a braking pressure reducing signal to actuate a braking pressure modulator thereby reducing braking pressure.

This invention relates to anti-skid systems for vehicles for preventing loss of steerability and irregular skidding of the vehicle due to the locking of the wheels.

The locking of the wheels may result if the torque derived from the friction force developed between the brake drum and the brake shoes urged thereagainst when rapidly braking the travelling vehicle (hereinafter referred to as brake torque BT) becomes extremely heavy as compared to the torque about the center of the wheel due to the force of reaction exerted by the ground surface in contact with the wheel tire (hereinafter referred to as tire torque TT).

Figure 1:
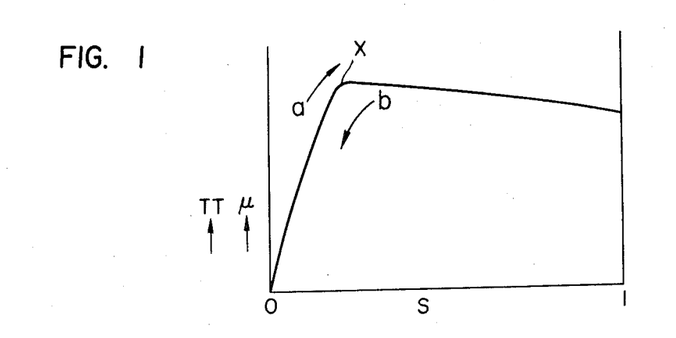
FIG. 1 shows an example of the well-known $\mu$-S characteristic relation between the road-wheel friction coefficient $\mu$ and the slip factor S.

It has been found that the coefficient of friction $\mu$ between the wheel and the road is related to the slip factor S for the wheel as generally shown in FIG. 1. The slip factor S is defined as $$S = (S_B - S_W)/S_B$$

where $S_B$ is the speed of the vehicle body and $S_W$ is the speed of the vehicle wheels. The friction coefficient $\mu$ or the absolute value of the tire torque TT varies widely depending upon the road condition it is large for a dry asphalt-paved road, for example, and small for a frozen road. Therefore, it involves extremely difficult technical problems in determining the coefficient of friction $\mu$ and the slip factor S of the wheel directly from the vehicle which is being braked. Accordingly, much effort has been expended to provide a substitute for the friction coefficient $\mu$ or slip factor S in order to always be able to provide ideal control of the brake torque without causing locking of the wheels on any road of whatever friction coeffiicent $\mu$.

The effects of the anti-skid system heretofore proposed are based on reducing the vehicle speed without causing locking of the wheels when braking the vehicle. In many conventional anti-skid systems, the actual wheel deceleration is mechanically or electrically detected, and as soon as the actual wheel deceleration exceeds a preset reference value the brake torque BT is forcibly reduced, irrespective of whether the driver acts to reduce the brake torque on the wheels, thereby preventing locking of the wheels to prevent the resultant loss of steerability and the irregular skidding of the vehicle.

In these conventional systems, however, the detected peripheral wheel deceleration has no bearing upon the friction coefficient $\mu$ or slip factor S regarding the road, on which the vehicle is being braked. Therefore, the ideal control of the brake torque may be attained on a road of a certain friction coefficient while it may not on a road of a different friction coefficient. Thus, the wheels would occasionally lock while the vehicle body is still moving and sometimes the brake torque would be excessively reduced resulting in an extremely long braking distance. In such cases, the merit of the anti-skid system disappears.

An object of the invention is to obviate the above drawback by the provision of an anti-skid system for vehicles, which enables ideal control of the brake torque so as to avoid locking the wheels and to provide a minimum braking distance on a road of any friction coefficient by detecting the maximum value of the friction coefficient for the road run by the vehicle, thereby providing a maximum tire torque, and in which the maximum friction coefficient and hence the maximum tire torque to minimize the braking distance without causing locking of the wheels may be attained by comparing the actual wheel speed with a reference wheel speed which decreases by a predetermined deceleration from an initial value being less than the actual wheel speed by a certain amount, reducing the brake torque when the actual wheel speed gets lower than the reference wheel speed thereby increasing the wheel speed and again increasing the brake torque when the subsequently increasing actual wheel speed exceeds the reference wheel speed, and shifting the deceleration rate to a higher or lower preset value in dependence upon the result of comparison of the variation of the subsequent actual wheel speed from its value when the braking torque is again increased and a reference variation.

Another object of the invention is to provide an anti-skid system for vehicles, which includes a reference wheel deceleration setting means to provide a high preset value as the reference wheel deceleration if the wheels are being accelerated at predetermined intervals after the brake torque is again increased while providing a low preset value if the wheels are being decelerated at the instant in question.

A further object of the invention is to provide an anti-skid system for vehicles, which includes a reference wheel deceleration setting means to change the initial reference wheel deceleration into a lower preset value if the subsequent actual wheel-speed exceeds by a predetermined value its speed when the brake torque is again increased, while retaining the initial reference wheel deceleration or changing it into a higher preset value if the predetermined amount is not exceeded.

According to the invention, by detecting the variation of the actual wheel speed subsequent to the instant of re-increasing of the brake torque, it is possible to thereby detect whether the present slip factor S is high or low with respect to the value corresponding to the peak X of the $\mu$-S curve as shown in FIG. 1. If the slip factor at that instant is detected to be high with respect to the peak X the reference wheel speed is controlled to be decreased to a lower value accounting for the rate of the reference wheel deceleration so as to have the next reduction signal appear at a comparatively early instant and continue for a comparatively long period. If the slip factor is detected to be low, the reference wheel deceleration is either retained unshifted or shifted into a higher value to have the next reduction signal appear at a comparatively late instant and continue for a comparatively short period, thereby controlling the slip factor $\mu$ during the braking period closer to the value corresponding to the peak X of the $\mu$-S curve so as to obtain an ideal brake control. In other words, according to the invention the brake torque is controlled in such a manner as to maintain the slip factor closer to a value corresponding to the peak X of the $\mu$-S curve, that is, a value for which the friction coefficient regarding the road run by the wheels is maximum. This enables obtaining the maximum tire torque to minimize the braking distance without causing the locking of the wheels. Also, since the control can be effected independently of the absolute value of the friction coefficient $\mu$, excellent effects of providing ideal and anti-skid action on any road, frozen as well as asphalt-paved roads, may be obtained.

The above and other objects, features and advantages of the invention will become more apparent from the detailed description taken in conjunction with the accompanying drawings, in which.

Figure 4A:
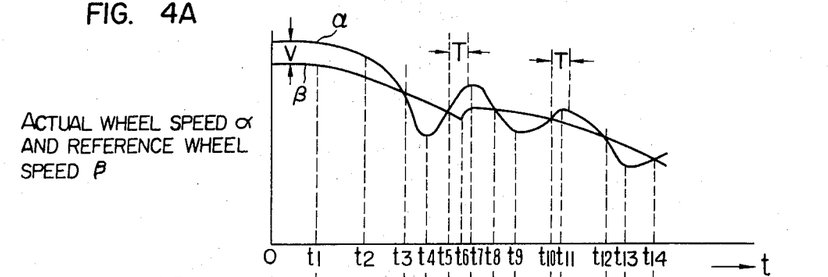
FIGS. 4A-4F the operational principles underlying the invention as well as the operation of the embodiment shown in FIG. 2.
Figure 4B:
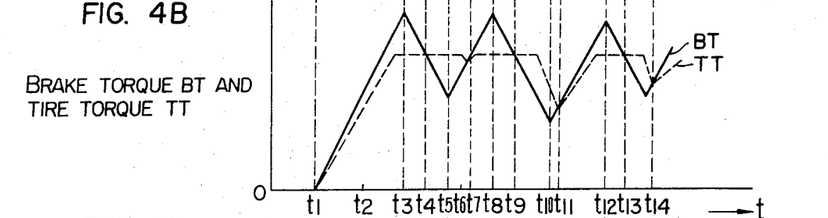

The operational principles underlying the invention will now be described in connection with a mode of operation with reference to graphs (A) and (B) in FIG. 4. In the figure, the abscissa is commonly taken for time $t$ and the ordinate represents actual wheel speed $\alpha$ and reference wheel speed $\beta$ in graph (A) and brake torque BT and tire torque TT in graph (B). In the preferred mode of operation according to the invention there are provided two present reference wheel decelerations, a higher value $G_1$ and a lower value $G_2$. The reference wheel speed is made to be lower than the actual wheel speed $\beta$ by a constant value V when the vehicle is traveling under normal driving conditions or without application of braking pressure, that is, when the brake torque BT is zero. Upon application of the brake torque to the wheels at instant $t_1$, the actual wheel speed $\alpha$ begins to decrease. The reference wheel speed $\beta$ is kept lower than the actual wheel speed by V until the actual peripheral deceleration of the wheels reaches the reference wheel deceleration $G_1$. From instant $t_2$, at which the actual peripheral deceleration of the wheels reaches the reference wheel deceleration $G_1$, the reference wheel speed $\beta$ is made to decrease at a rate corresponding to the reference wheel deceleration $G_1$. The brake torque BT is increased until the actual wheel speed $\alpha$ gets lower than the reference wheel speed $\beta$ at instant $t_3$, whereupon it begins to be decreased, as is seen from graph (B) in FIG. 4. As a result, the actual wheel speed $\alpha$ subsequently begins to increase. At time $t_5$, at which the actual wheel speed $\alpha$ exceeds the reference wheel speed $\beta$, the brake torque BT turns to increase. With further increase of the actual wheel speed $\alpha$, it goes above the reference wheel speed $\beta$ by just V at instant $t_6$. At this instant, the relation between the reference wheel speed $\beta$ and actual wheel speed $\alpha$ becomes the same as previously existed up to instant $t_2$. With further increase in the brake torque BT the actual wheel speed $\alpha$ eventually beings to decrease. If the actual wheel speed $\alpha$ is increasing, that is, if the wheels are being accelerated, at an instant a predetermined time T after instant $t_5$, during which time the brake torque BT is continuously increasing, the reference deceleration is switched to the lower preset value $G_2$. On the other hand, if the actual wheel speed $\alpha$ is decreasing, that is, if the wheels are being decelerated, at the instant in question, the higher preset value $G_1$ is retained as the subsequent reference deceleration. In this manner the determination of a suitable reference deceleration is repeatedly effected at each of the repetitive instants a predetermined time after the start of the increase of the brake torque BT. The aforementioned predetermined time T may be appropriately determined by taking the rate of increase of the brake torque BT into consideration.

With the above mode of operation the braking of the wheels can be controlled with respect to a point near the peak X of $\mu$-S curve shown in FIG. 1 to achieve the end of the anti-skid action. Thus, the locking of the wheels may be prevented as well as minimizing the braking distance, thereby preventing loss of steerability and irregular skidding of the vehicle, so that the vehicle can be braked safely.

In the preceding description. there are adopted two preset values, namely a higher value $G_1$ and a lower value $G_2$, for the reference deceleration. In general, a plurality of preset values may be adopted for the reference deceleration, so that the reference deceleration may be switched to the next lower preset value if the wheels are being accelerated at an interval T after reincreasing the brake torque BT having been once decreased, while switching to the next higher preset value if the wheels are being decelerated at the instant in question. In this manner the same end may be achieved.

The same end may also be achieved without having resort to the reference wheel speed $\beta$, so long as the braking is controlled to increase the actual wheel speed $\alpha$ if the wheels are being accelerated at an interval T after reincreasing the brake torque BT and decrease the actual wheel speed if the wheels are being decelerated at the instant in question.

The reason why the tire torque TT can be controlled with respect to a point near the peak X of $\mu$-S curve shown in FIG. 1 with the above action will now be discussed.

There is a relation between the brake torque BT applied to the wheels and the tire torque TT as expressed by the equation $$BT = TT + M$$

where M is the torque due to the momentum of the wheels. The equation means that the difference between the brake torque BT and the tire torque TT is proportional to the deceleration or acceleration of the wheels. The mode of operation described above thus can be illustrated in terms of the brake torque BT and tire torque TT, as shown in Graph (B) in FIG. 4. As is seen, when the brake torque BT is greater than the tire torque TT the wheels are being decelerated, whereas when the brake torque is less than the tire torque the wheels are being accelerated. When the brake torque BT begins to develop at instant $t_1$, the actual wheel speed $\alpha$ starts to decrease. The tire torque TT also begins to develop as a function of the actual wheel deceleration. The tire torque TT increases as a function of the slip factor S as indicated by the arrow $a$ in FIG. 1. As soon as the actual wheel speed $\alpha$ gets lower than the reference wheel speed $\beta$ as at instant $t_3$, the brake torque BT begins to decrease. The actual wheel speed $\alpha$ continues to decrease until instant $t_4$, and the tire torque TT increases in the direction of arrow $a$ with respect to the TT-S curve of FIG. 1 until instant $t_4$. With decreasing brake torque BT the actual wheel speed $\alpha$ begins to increase as at instant $t_4$. As soon as the actual wheel speed $\alpha$ exceeds the reference wheel speed $\beta$ as at instant $t_5$, the brake torque BT commences to increase. The wheels continue to be accelerated from instant $t_5$ till instant $t_7$. During this period the tire torque TT changes in the direction shown by an arrow $b$ along the TT-S curve in FIG. 1, and sharply decreases after reaching the peak X. If the slip factor S is high at instant $t_5$, the tire torque TT will not readily decrease in spite of the reduction of the brake torque BT, resulting in a relatively long period from $t_5$ to $t_7$. The fact that the wheels are still being accelerated at a predetermined interval T after the reincreasing of the brake torque BT means that the slip factor S at $t_5$ is higher than the value at the peak X of the $\mu$-S curve. Hence, the subsequent reference deceleration should be set to a lower value to reduce the deceleration of the actual wheel speed $\alpha$ so as to reduce the slip factor S. On the other hand, the slip factor S at $t_{10}$ is low so that the tire torque TT is also decreased, with a result that the interval from $t_{10}$ when the brake torque is again increased to $t_{11}$ when the wheel speed begins to decrease is relatively short. Therefore, the subsequent reference deceleration should be set to a higher value to increase the rate of decrease of the actual wheel speed $\alpha$, thereby increasing the slip factor S. The mode of operation described above is related to the difference between the brake torque BT and tire torque TT, i.e., the acceleration and deceleration of the wheels, but does not have any direct bearing upon the absolute value of the tire torque TT. In this mode of operation, the tire torque TT is controlled so as to bring the slip factor S closer to the peak X of the $\mu$-S curve of FIG. 1, so that an ideal anti-skid control may be achieved on a road surface of any friction coefficient.

To summarize the operational principles described above underlying the invention, the reference deceleration to modify the reference wheel speed is varied in accordance as to whether the wheels are being accelerated or decelerated at a predetermined interval after the released brake torque is again exerted so as to bring the slip factor closer to the peak X of the $\mu$-S curve of FIG. 1, so that an ideal brake torque without causing locking of the wheels may always be applied to the wheels.

Figure 2:
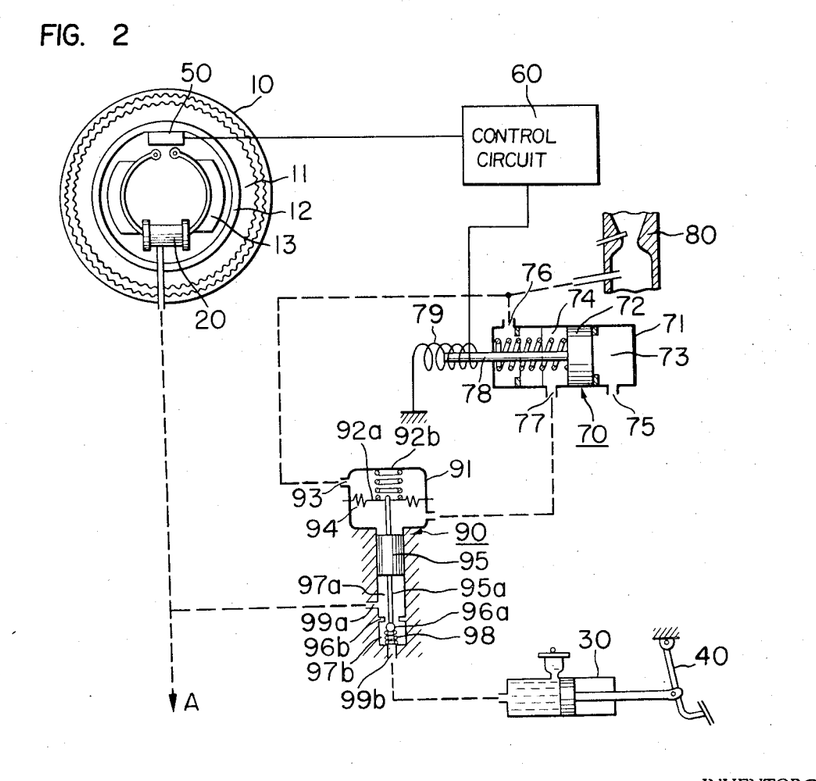
FIG. 2 schematically outlines, partly in sectional views, an embodiment of the anti-skid system for vehicles according to the invention.

A preferred embodiment of the system to realize the aforedescribed mode of operation according to the invention is outlined in FIG. 2. Referring to the figure, reference numeral 10 designates a wheel with a wheel tire 11, a brake drum 12, brake shoes 13 and a wheel cylinder 20 to provide hydraulic pressure forcing the brake shoes 13 against the brake drum 12. Numeral 30 designates a master cylinder to produce hydraulic pressure corresponding to the position of the brake pedal 40. Numeral 50 designates a DC generator provided to the wheel 10. It constitutes a wheel speed voltage generator to generate a DC voltage corresponding to the actual peripheral speed of the wheel 10 (hereinafter referred to merely as the actual wheel speed voltage). Numeral 60 designates a control circuit receiving the actual wheel speed voltage produced by the DC generator 50. It produces, upon detection of a sharp decrease of the actual wheel speed voltage indicating that the wheel 10 is about to lock, a brake torque reduction signal for forcibly reducing the brake torque (hereinafter referred to merely as a reduction signal) whether the driver intends to reduce the brake torque or not. Thus, the DC generator 50 and the control circuit 60 constitute a lock detection means. Numeral 70 designates a three-way switch-over electromagnetic valve means. It comprises a cylinder 71 and a piston 72 slidable therein and defining two sections or compartments 73 and 74. The compartment 73 communicates with the atmosphere via a passage 75, while the compartment 74 communicates both with an intake tube 80 of the engine mounted on the vehicle via a passage 76 to introduce the intake negative pressure and with a compartment 94 of a brake torque regulating means 90 to be described hereinafter via another passage 77. A piston rod 78 tied to the piston 72 extends through an electromagnetic coil 79. When the control circuit 60 produces its output reduction signal, the coil 79 is energized to attract the piston 72 towards it by the electromagnetic force of attraction so as to displace the piston to a position indicated by broken lines, thus cutting communication between the passages 76 and 77 while establishing communication between passages 77 and 75. The brake torque regulating means 90 has two compartments 93 and 94 defined by a casing 91 and a diaphragm 92a, with the compartment 93 communicating with the intake tube 80 and the compartment 94 communicating with the compartment 74 of the three-way changeover electromagnetic valve means 70 as mentioned earlier. A spring 92 is disposed within the compartment 93. The diaphragm 92a is tied through a rod to a piston 95. Extending from the piston 95 downwards in the figure is a valve actuating rod 95a adapted to be in contact with a valve member 96a. A valve port 96b defines compartments 97a and 97b.

A spring 98 provides a force urging the valve member 96a into contact with the valve port 96b. The compartment 97a communicates with the wheel cylinder 20 via a passage 99a, while the compartment 99b communicates with the master cylinder 30 via a passage 99b. Arrow A indicates the hydraulic path communicating with the other wheel cylinders (not shown).

In operation, in the absence of the reduction signal of the control circuit 60 the piston 72 is held in its position shown by the solid lines in FIG. 2. When the piston 72 is in this position, the engine intake negative pressure in the intake tube 80 is led into the compartment 74 of the three-way switch-over electromagnetic valve means 70 and thence into the compartment 94 of the brake torque regulating means 90. The engine intake negative pressure is also led into the compartment 93 of the brake torque regulating means. In this state, the pressure in the compartments 94 and 93 is uniform, and the valve member 96a is held detached from the valve port 96b since it is displaced against the spring force of the spring 98 by the spring force of the spring 92b, which is also urging the diaphragm 92a to displace the diaphragm towards the compartment 94, through the piston 95 and the valve actuating rod 95a. Thus, in this state the compartments 97a and 97b are communicating with each other to hold the master cylinder 30 in communication with the wheel cylinder 20 via the compartments 97a and 97b, so that the hydraulic pressure developed in the master cylinder 30 in accordance with the extend of depression of the brake pedal 40 is directly transmitted to the wheel cylinder 20 to provide for the normal braking action. When the reduction signal appears from the control circuit 60, the electromagnetic coil 79 of the three-way changeover electromagnetic valve means 70 is energized, and by the resultant electromagnetic force of attraction the piston 72 is brought to its position shown by the broken lines in FIG. 2, thus cutting communication between the passages 76 and 77 while providing communication between the passages 77 and 75. As a result, atmospheric pressure is introduced into the compartment 94 of the brake torque regulating means 90, so that the diaphragm 92a is displaced against the spring force of the spring 92b toward the compartment 93, in which the engine intake negative pressure is prevailing, thus displacing the piston 95 and detaching the valve actuating rod 95a from the valve member 96a. In consequence, the valve member 96a is urged into contact with the valve port 96b by the spring force of the spring 98, cutting the communication between the compartments 97a and 97b and hence the communication between the master cylinder 30 and the wheel cylinder 20. Also, at this time owing to the displacement of the piston 95, the volume of the compartment 97a separated from the compartment 97b is increased to reduce the hydraulic pressure in the wheel cylinder 20 in communication with the compartment 97a. In the above manner, when the wheel approaches a locking condition the brake torque applied to the wheel may be forcibly reduced whether the driver intends to reduce the brake torque or not, thus automatically preventing the locking of the wheel.

Figure 3:
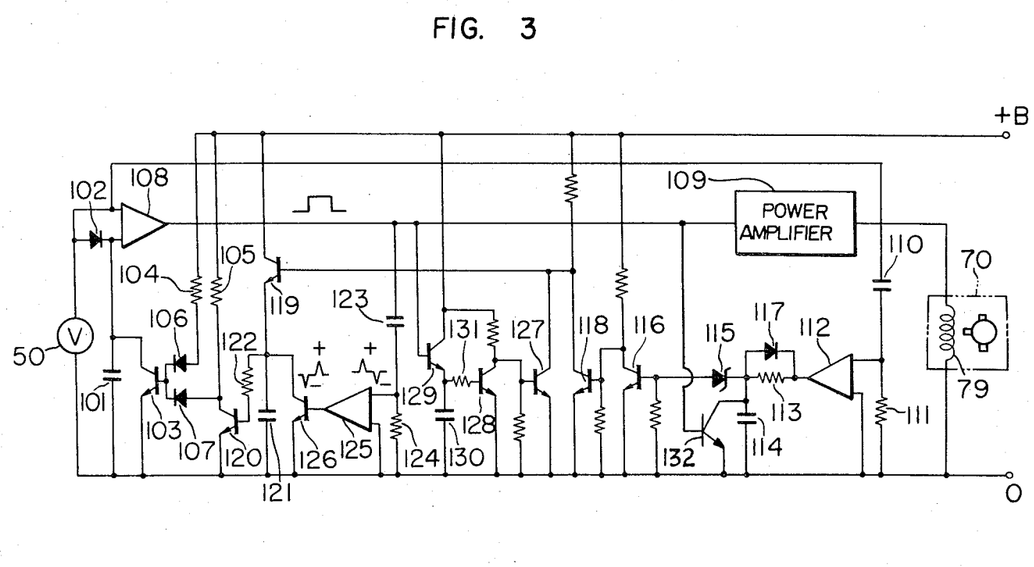
FIG. 3 is a circuit diagram showing an example of the lock detection means in the anti-skid system shown in FIG. 2.

The lock detection means, consisting of the DC generator 50 and the control circuit 60, is shown in detail in FIG. 3. Referring to the figure, numeral 50 designates the DC generator mentioned earlier, which is coupled to the wheel axle and constitutes a wheel speed voltage generator to generate an actual wheel speed voltage corresponding to the actual wheel speed. Such arrangements as an AC generator combined with a rectifier or a pulse generator combined with a digital-analog converter may be substituted for the DC generator 50 in the invention. The actual wheel speed voltage of the DC generator 50 is applied across a capacitor 101 to charge the same. A diode 102 serves to prevent the reverse flow of charges accumulated in the capacitor 101 passing into the DC generator 50. The capacitor 101 is adapted to be discharged through the collector-emitter path of a transistor 103. The time constant for the discharging of the capacitor 101 is set such as to provide a predetermined reference deceleration, for instance 1.0G (G means gravitational acceleration). Thus, the terminal voltage across the capacitor 101 (hereinafter referred to as reference wheel speed voltage) represents the reference wheel speed dcreasing at a predetermined deceleration rate, i.e. the reference deceleration. Resistors 104 and 105 determine the base current, and hence the collector current, in the transistor 103. In other words, they determine the time constant for the discharge of the capacitor 101 and hence the reference decelartion. Diodes 106 and 107 serve to prevent the mutual interference of currents through the resistors 104 and 105. The capacitor 101, diodes 102, transistor 103, and resistors 104 and 105 constitute a reference wheel speed voltage generator. Numeral 108 designates a first differential amplifier. It compares the actual wheel speed voltage across the DC generator 50 and the reference wheel speed voltage across the capacitor 101. It provides the reduction signal when the former gets lower than the latter. The reduction signal disappears when the former exceeds the latter. Numeral 109 designates a power amplifier to power amplify the reduction signal from the differential amplifier 108 so as to provide output signal power sufficiently high to operate the three-way electromagnetic valve means 70 by energizing the electromagnetic coil 79 thereof. A series connection of a resistor 111 and a capacitor 110 is connected across the DC generator 50. It constitutes a differential circuit to derive the time differential of the actual wheel speed, that is, the acceleration or deceleration of the wheels. In other words, it discriminates whether the wheels are being accelerated or decelerated. Numeral 112 designates a second differential amplifier. It compares the output potential of the differential circuit, which comprises the capacitor 110 and resistor 111 and differentiates the actual wheel speed voltage of the DC generator 50 with respect to time, with zero potential. It provides positive output voltage of B volts if the output of the differential circuit is positive, that is, the acceleration signal, and zero or negative output voltage if the output of the differential circuit is negative, that is, the deceleration signal. In this embodiment the source voltage is B volts. An integrating circuit consisting of a resistor 113 and a capacitor 114 constitutes a timing circuit. A transistor 132 shortcircuits the capacitor 114 during the presence of the reduction, signal at the input of the differential amplifier 112 and it is cut off with the disappearance of the reduction signal, whereupon the acceleration signal appears at the input of the differential amplifier 112, which thereupon produces an output voltage of +B volts. If the acceleration signal continues beyond a period, for instance 100 msec., depending upon both the time constant of the circuit consisting of resistor 113 and capacitor 114 and the zener voltage of the constant-voltage diode 115, current is supplied through the constant-voltage diode 115 into the base of the transistor 116 to trigger the transistor 116. On the other hand, if the acceleration signal disappears before the termination of the predetermined period, the charge accumulated on the capacitor 114 is discharged upon the disappearance of the acceleration signal through the diode 117 and a path inside the differential amplifier 112 leading to ground. In either case, the condition for providing the aforesaid predetermined period is recovered upon the disappearance of the acceleration signal, and thereupon it becomes valid for the next appearance of the acceleration signal at the input of the differential amplifier 112. Transistors 118, 119 and 120 cooperate with the transistor 116 to provide for the switching of time constants to be described hereinafter. If the acceleration signal continues beyond a predetermined time interval after the disappearance of the reduction signal, the transistor 116 is triggered upon termination of the aforesaid predetermined time interval, thereupon cutting off the transistor 118 to impress the source voltage of B volts upon the base of the transistor 119, thus triggering the transistor 119 to charge the capacitor 121 with the source voltage of +B volts. As soon as the terminal voltage built up across the capacitor 121 exceeds the cut-off base voltage for the transistor 120, the transistor 120 is triggered. Upon the triggering of the transistor 120 the current having previously flown through the resistor 105 into the base of the transistor 103 begins to flow through the collector-emitter path of the transistor 120. Thus, the base current passing into the transistor 103 is reduced to only the current through the resistor 104. As a result, the collector current in the transistor 103 is reduced to increase the time constant for the discharging of the capacitor 101. In this manner, the reference wheel deceleration to modify the reference wheel speed may be switched from the initial preset value of 1.0G, for instance (hereinafter referred to as first reference deceleration), to a second preset value lower than the first, for instance 0.2G. After the cutting-off of the transistor 119 the discharging current from the capacitor 121 flows into the base of the transistor 120, so thereafter the transistor 120 continues "on" for a predetermined period depending upon the time constant for the circuit of capacitor 121 and resistor 122. Upon the termination of the above period the transistor 120 is cut off thus re-shifting the reference wheel deceleration from the second preset value of 0.2G into the first preset value of 1.0G. The transistors 116, 118, 119 and 120, the capacitor 121 and a reduction signal hold circuit to be described hereinafter constitute a time constant setting circuit. A capacitor 123 and a resistor 124 constitute a differentiator circuit, whose output is amplified by an amplifier 125. The amplifier 125 together with the differentiator circuit consisting of capacitor 123 and resistor 124 serves to provide a positive pulse signal upon disappearance of the reduction signal from the differential amplifier 108. The positive pulse is impressed on the base of a transistor 126 to trigger the transistor 126 so as to rapidly discharge the capacitor 121 through the collector-emitter path of the transistor 126 so that the reference wheel deceleration is reset from the second preset value of 0.2G into the first preset value of 1.0G. The reduction signal hold circuit mentioned earlier comprises transistors 127, 128 and 129. Without this circuit, the transistor 116 will be triggered prior to the appearance of the reduction signal for the first time. This may take place as a result of the usual acceleration or deceleration of the wheels. If this happens, the transistor 118 is triggered to cause the source voltage of +B volts to appear across the capacitor 121, thus switching the first reference wheel deceleration for the reference wheel speed into the second reference wheel deceleration of 0.2G. The reduction signal hold circuit eliminates the inconvenience that the first reference wheel deceleration is otherwise switched into the second reference wheel deceleration prior to the appearance of the first reduction signal. The transistors 127 and 118 are adapted to constitute an AND circuit. If the differential amplifier 108 produces the reduction signal as a result of the increasing of the actual wheel deceleration beyond the first reference deceleration of 1.0G, the reduction signal is impressed on the base of the transistor 129 to trigger the transistor 129, thus causing the charging of the capacitor 130 with the source voltage of +B volts. As soon as the terminal voltage across the capacitor 130 exceeds the base cut-off voltage for the transistor 128, the transistor 128 is triggered to cut off the transistor 127. After the cutting-off the transistor 129 with the disappearance of the reduction signal, the charging current from the capacitor 130 flows into the base of the transistor 128, so thereafter the transistor 128 continues "on" for a predetermined period, for instance 0.5 sec., depending upon the time constant for the circuit of capacitor 130 and resistor 131 hold the transistor 127 "off" for this period. Thus, only when both the transistors 118 and 127 are simultaneously "off," the transistor 119 is triggered to trigger the transistor 120. In other words, if the transistor 127 is "on," upon the triggering of the transistor 118 current is caused not to flow into the base of the transistor 119, but to flow through the collector-emitter path of the transistor 127, so that the transistor 119 will not be triggered. In this case, the reference wheel deceleration to modify the reference wheel speed remains at the first preset value of 1.0G. For the reference wheel deceleration to be shifted from the first preset value of 1.0G into the second preset value of 0.2G, the acceleration signal entering the differential amplifier 112 should continue after the disappearance of the reduction signal at least for a predetermined time interval. It will thus be apparent that the shifting into the second reference wheel deceleration never results from the usual acceleration or deceleration of the wheels.

The operation of the lock detection means described above embodying the invention will now be described with reference to FIGS. 4A to 4F. In the figures, the abscissa is commonly taken for time $t$ in all the figures, and the ordinate represents actual wheel speed $\alpha$ and reference wheel speed $\beta$ in FIG. 4A, brake torque BT and tire torque TT in FIG. 4B, a reduction signal appearing from the differential amplifier 108 in FIG. 4C, an acceleration signal entering the differential amplifier 112 and indicating that the actual wheel speed $\alpha$ is increasing in FIG. 4D, terminal voltage across the capacitor 121 in FIG. 4E, and reference wheel deceleration with the first and second preset values of 1.0G and 0.2G in FIG. 4F.

Figure 4C:
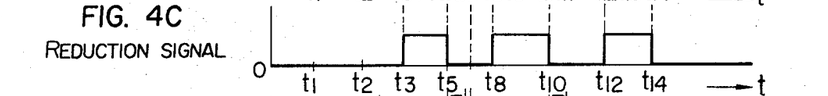
Figures 4D, 4E, 4F:
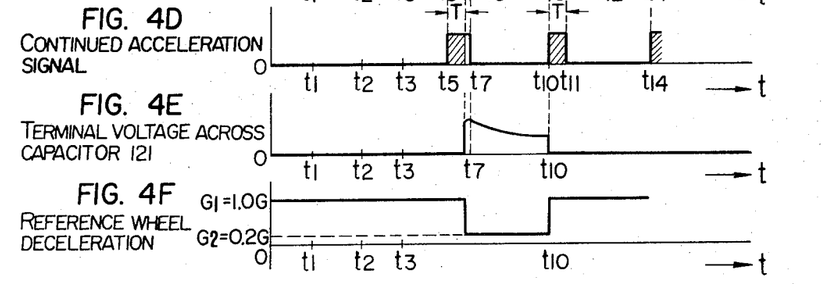

During the normal driving of the vehicle, the actual wheel speed voltage of the DC generator 50 is applied through the diode 102 to the capacitor 101 to charge the capacitor 101. The terminal voltage developed across the capacitor 101 constitutes the reference wheel speed voltage. The reference wheel speed voltage is lower than the actual vehicle speed voltage by the forward voltage drop across the diode 102 (corresponding to V in FIG. 4A). In this situation the differential amplifier 108 will not provide the reduction signal. Upon application of the brake torque at $t_1$, the wheels start to be decelerated. As soon as the actual wheel deceleration exceeds the first preset value, 1.0 for instance, of the reference wheel deceleration, the capacitor 101 starts to be discharged at a rate constituting the first preset deceleration of 1.0G. The terminal voltage across the capacitor 101 at $t_1$ affords the reference wheel speed voltage. At $t_3$ the actual wheel speed voltage derived from the DC generator 50 gets lower than the reference wheel speed voltage across the capacitor 101, whereupon the differential amplifier 108 produces the reduction signal (positive signal), as shown in FIG. 4C. The reduction signal thus produced is amplified by the power amplifier 109 for application across the electromagnetic coil 79 of the three-way electromagnetic valve means 70, thus causing the action of the brake torque regulating means 90 to reduce the hydraulic pressure in the wheel cylinders and hence reduce the brake torque BT applied to the wheels. As a result, the actual wheel speed $\alpha$ begins to increase by virtue of the tire torque TT exerted to the wheels by the road surface in contact with the wheels owing to the thrust momentum of the vehicle. After $t_3$, that is, after the appearance of the reduction signal, however, the actual wheel speed $\alpha$ continues to decrease till $t_4$, because of the delay involved in the action of the three-way electromagnetic valve means 70 and the brake torque regulating means 90. The hydraulic pressure in the wheel cylinders will not be reduced to zero immediately after appearance of the reduction signal, but it is gradually reduced at a certain decreasing rate. Simultaneously with the rise-up of the actual wheel speed $\alpha$ in the presence of the reduction signal the actual wheel speed voltage turns to increase at $t_4$. The reduction signal from the differential amplifier 108 continues until the actual wheel speed voltage exceeds the reference wheel speed voltage at $t_5$, whereupon it disappears. It continues so long as the actual wheel speed voltage is lower than the reference wheel speed voltage. Upon the disappearance of the reduction signal, a negative pulse voltage appears on the non-grounded side of the resistor 124 of the differentiating circuit, which consists of the resistor 124 and the capacitor 123, causing the amplifier 125 to provide a positive output pulse to the transistor 126 to trigger the transistor 126. Upon the triggering of the transistor 126, the capacitor 121 is rapidly discharged through the collector-emitter path of the transistor 126, if a charge has previously been stored on the capacitor 121. As is described earlier, if the value of the slip factor S is considerably high at $t_5$ compared with the peak X of the $\mu$-S curve of FIG. 1, it takes a long time until the slip factor S is reduced to a value corresponding to the peak X, that is, it takes a long time until the actual wheel speed $\alpha$ begins to decrease. In other words, with a high value of the slip factor S the period of charging of the capacitor 101 is long with the result that the voltage developed across the capacitor 101 during this period is low. Thus, if the slip factor S is high at $t_5$, the acceleration signal appearing at the input of the differential amplifier 112 upon disappearance of the reduction signal continues longer than the predetermined time interval T (for instance, 100 msec.) depending upon both the time constant of the circuit consisting of resistor 113 and capacitor 114 and the Zener voltage of the constant-voltage diode 115, as shown in FIG. 4D. Upon termination of the time interval T at which time the transistor 132 is already "off," current is caused to pass through the constant-voltage diode 115 to the base of the transistor 116 to trigger the transistor 116 and cut off the transistor 118. Meanwhile, the transistor 127, which is cut off upon appearance of the reduction signal, remains "off" for a predetermined time (for instance, 500 msec.) depending upon the time constant of the circuit of capacitor 130 and resistor 131, as mentioned earlier. With the time interval T from the time of rising-up of the actual wheel speed till the cutting-off of the transistor 118 set to 100 msec., the transistor 118 is cut off while the transistor 127 is still "off." Thus, the capacitor 121 is charged as shown in FIG. 4E. Upon charging of the capacitor 121, the transistor 120 becomes conductive and the first reference wheel deceleration of 1.0G for the reference wheel speed is switched to the second preset value 0.2G, as shown in FIG. 4F. The second reference deceleration thus introduced continues until the instant $t_{10}$, at which time the reduction signal having appeared at $t_8$ disappears.

Subsequently, if the value of the slip factor S at $t_{10}$ is very close to the value corresponding to the peak of the $\mu$-S curve of FIG. 1, it takes a short time until the actual wheel speed $\alpha$ turns to decrease. With a value of the slip factor S closer to the peak X at $t_{10}$, the subsequent rising of the actual wheel speed $\alpha$ is more gradual and ends in a shorter time. Consequently, the duration of the acceleration signal entering the differential amplifier 112 is shorter than the predetermined time interval T as shown in FIG. 4D. In this case, the first preset value 1.0G of the reference wheel deceleration is not shifted to the second preset value.

In the above embodiment, the discrimination between the increase and decrease of the actual wheel speed $\alpha$ after the appearance of the reduction signal is achieved by feeding the actual wheel speed voltage developed across the DC generator 50 to the differentiator circuit consisting of capacitor 110 and resistor 111. Alternatively, it is possible to sufficiently effect the discrimination by substituting the reference wheel speed voltage built up across the capacitor for the actual wheel speed voltage.

The operational principles underlying the invention may be modified. An alternative mode of operation adopting a modification of the operational principles underlying the invention will now be given. In this mode of operation the sequence of events is the same as in the previous mode of operation until $t_5$ with respect to FIG. 4. In this mode of operation the reference wheel deceleration G is shifted into a lower preset value $G_2$ if the actual wheel speed $\alpha$ becomes higher than the value thereof at $t_5$ by more than the predetermined amount V during the absence of the reduction signal, while its initial higher value $G_1$ is retained so long as the extent of increase of the actual wheel speed from the value thereof at $t_5$ does not exceed the predetermined speed gap V. In this manner the determination of the reference wheel deceleration is repeated. The predetermined speed gap V is appropriately selected by taking the positive slope of the brake torque BT into consideration.

With this mode of operation the tire torque may be controlled in the proximity of the value corresponding to the peak X of the $\mu$-S curve of FIG. 1, thus achieving the end of the anti-skid operation. In other words, according to the modified operational principles the slip factor S is controlled to the proximity of the value corresponding to the peak X of the $\mu$-S curve of FIG. 1 by determining its magnitude from the extent of its subsequent increase.

Figure 5:
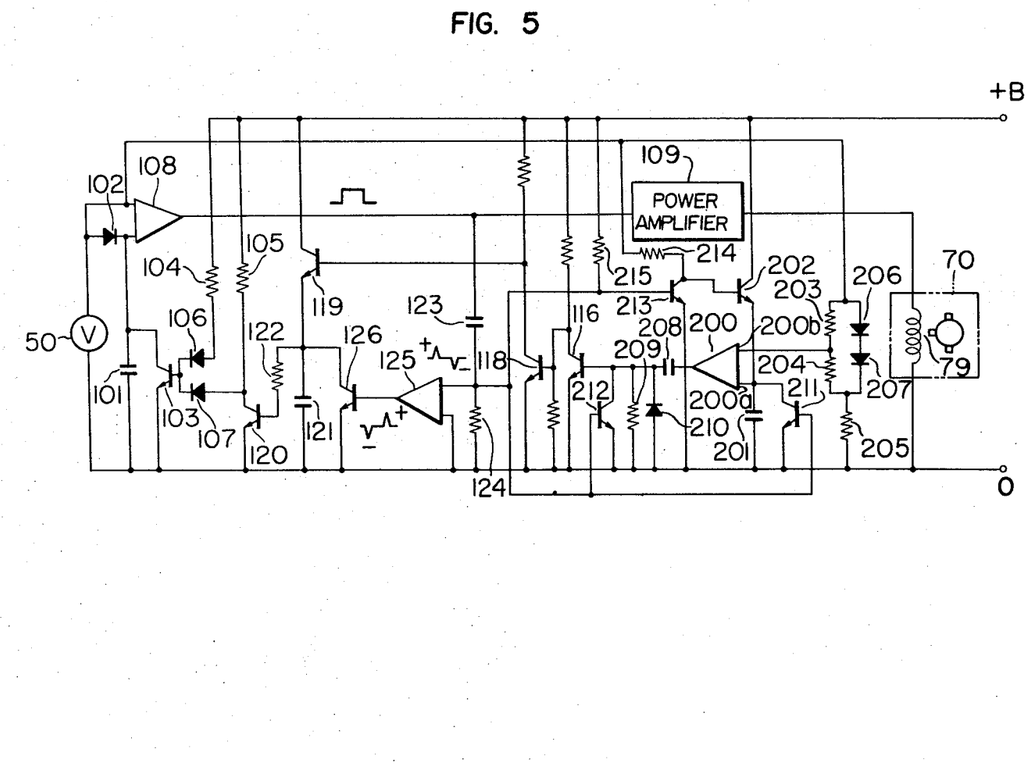
FIG. 5 is a circuit diagram showing another example of the lock detection means in the anti-skid system according to the invention.

An example of the control circuit to realize this mode of operation is shown in FIG. 5. It is fundamentally the same as the circuit of FIG. 3 except for a second differential amplifier 200. The second differential amplifier 200 detects a voltage corresponding to afore-said speed gap V relative to the actual wheel speed $\alpha$ as described earlier in connection with FIG. 4A. It has its input terminal 200a applied with the terminal voltage across a capacitor 201. The non-grounded terminal of the capacitor 201 is also connected to the emitter of a transistor 202, which has its base connected through a resistor 214 to one terminal of the DC generator 50 and its collector connected to source terminal held at +B volts. The base of the transistor 202 is also connected to the collector of a transistor 213 having its base connected through a resistor 215 to the source terminal +B. The base of the transistor 213 is also connected to the connection between a capacitor 123 and a resistor 124. The capacitor 123 and resistor 124 constitute a differentiator circuit to differentiate the reduction signal output of the differential amplifier 108. The transistor 213 is normally "on," for current normally flows from the source terminal +B through the resistor 215 into its base. On the other hand, the transistor 202 is normally "off." At this time the capacitor 201 is not charged. Upon the disappearance of the reduction signal of the differential amplifier 108, the differentiator circuit consisting of capacitor 123 and resistor 124 produces a negative pulse for impression on the base of the transistor 213 to cut off the transistor 213, triggering the transistor 202, thus starting to charge the capacitor 201. The capacitor 201 is charged up to the actual wheel speed voltage of the DC generator 50, and thus registers the actual wheel speed voltage at the instant of the disappearance of the reduction signal. The other input terminal 200b of the second differential amplifier 200 is applied with an output of a voltage divider, which comprises resistors 203, 204 and 205 and diodes 206 and 207, and on which the output voltage, i.e., the actual wheel speed voltage, of the DC generator 50 is impressed. Comparing the voltage impressed upon the input terminal 200a of the second differential amplifier 200 at the instant of the disappearance of the reduction signal and the voltage impressed upon the other terminal 200b at that instant, the former is apparently higher than the latter, because the input voltage on the input terminal 200b is the sum of the terminal voltage accross the resistor 205 and the terminal voltage across the resistor 204, which is the forward voltage drop across the diodes 206 and 207 minus the terminal voltage across the resistor 203. Since the forward voltage drop across the diodes 206 and 207 in series is substantially constant unless the output voltage of the DC generator 50 becomes sufficiently low, the terminal voltage across the resistor 203, i.e., a division of the forward voltage drop across the diodes 206 and 207, is similarly constant. In other words, the input voltage on the input terminal 200b of the second differential amplifier 200 is normally lower than the output voltage of the DC generator by a certain constant amount. This potential difference is selected to a value corresponding to the speed gap V relative to the actual wheel speed shown in FIG. 4A. The second differential amplifier 200 is adapted to produce a positive output voltage if the input voltage on the input terminal 200a is lower than the input voltage on the input terminal 200b and a negative output voltage in the converse case. The output terminal of the second differential amplifier 200 is connected to a differential circuit consisting of a capacitor 208 and a resistor 209. As soon as the negative output voltage of the second differential amplifier 200 becomes positive, a positive pulse is developed across the resistor 209 causing current to flow into the base of the transistor 166 to trigger the transistor 116. A diode 210 serves to cause the discharging of the capacitor 208 through a path leading through the amplifier 200 to ground before the negative output voltage of the amplifier 200 becomes positive, so that the differential circuit will function properly when the output voltage of the amplifier 200 becomes positive. A transistor 211 serves to ensure the registering of the actual wheel speed voltage upon the disappearance of the reduction signal of the first differential amplifier 108. It is triggered upon the appearance of the reduction signal by a signal from the differential circuit of capacitor 123 and resistor 124 to render the capacitor 201 completely discharged and ready for the next registering of the actual wheel speed voltage. A transistor 212 serves to prevent the malfunctioning of the second differential amplifier 200. Without the transistor 212, the transistor 116 would be triggered upon the appearance of the reduction signal, because thereupon the transistor 211 is triggered to discharge the capacitor 211, thus causing a positive signal to appear at the output terminal of the second differential amplifier 200 to cause the differential circuit of capacitor 208 and resistor 209 to produce a positive pulse signal so as to cause a base current to flow into the transistor 116. By the provision of the transistor 212, the positive pulse output appearing from the second differential amplifier 200 at the time of appearance of the reduction signal is bypassed through the transistor 212, so that the transistor 116 remains "off." Transistors 118, 119 and 120 cooperate with the transistor 116 to provide for switching action. Upon the triggering of the transistor 116 the transistor 118 is cut off to impress the source voltage of B volts on the base of the transistor 119, thus triggering the transistor 119 to control the time constant accounting for the reference deceleration in a similar manner to that described in connection with the arrangement shown in FIG. 3. The output of the differential circuit of capacitor 123 and resistor 124 is also impressed on the base of the transistors 211 and 212 to trigger the transistors 211 and 212 in the presence of the reduction signal.

Figure 6A:
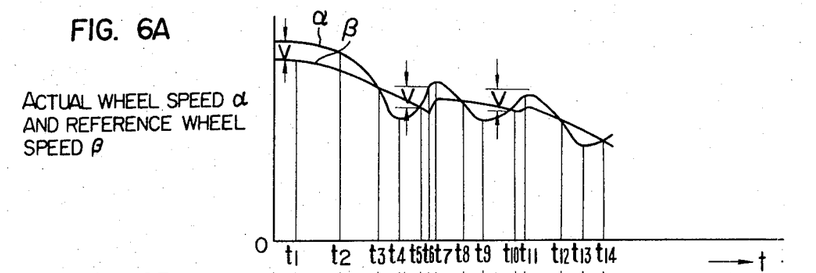
FIGS. 6A-6F and 7A-7D illustrates a modification of the operational principles underlying the invention as well as the operation of the embodiment shown in FIG. 5.
Figure 6B:
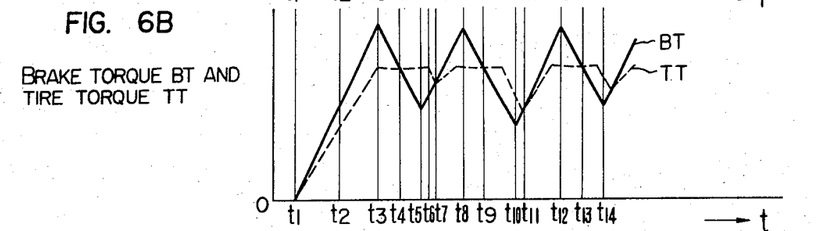
Figure 6C:
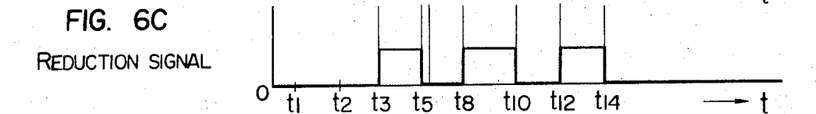
Figure 6D:
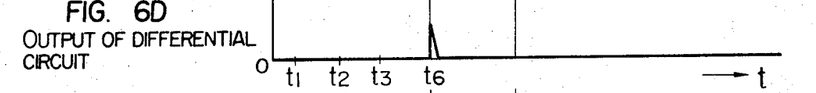
Figure 6E:
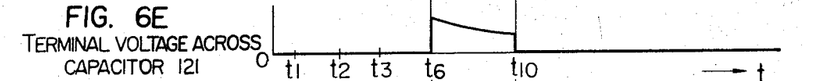
Figure 6F:
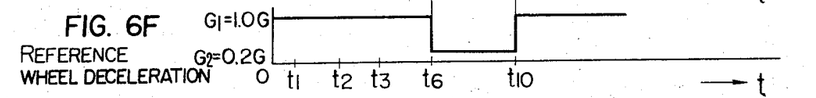

The operation of the construction described above according to the invention will now be described with reference to FIGS. 6A to 6F. In the figures, the abscissa is taken for time $t$ in all the graphs and the ordinate is taken for the same parameters as in FIGS. 4A to 4F except for FIG. 6D, in which the ordinate represents the output signal of the second differential amplifier 200 to discriminate the speed gap V relative to the actual wheel speed $\alpha$. The sequence of events is the same as that for the preceding embodiment described in connection with FIGS. 4A to 4F until instant $t_5$, at which the reduction signal disappears. Upon the disappearance of the reduction signal, a negative pulse voltage appears on the nongrounded side of the resistor 124 of the differential circuit of resistor 124 and capacitor 123. As a result, the amplifier 125 produces a positive output pulse for impression on the base of the transistor 126 to trigger the transistor 126, thereby rapidly discharging the capacitor 121 through the collector-emitter path of the transistor 126. Now if the slip factor S at instant $t_5$ is considerably higher with respect to the peak X of the $\mu$-S curve of FIG. 1, the amount of increase of the actual wheel speed $\alpha$, that is, the amount of increase of the actual wheel speed voltage during the period from $t_5$ till $t_7$, at which the actual wheel speed becomes maximum, is large. In such a case, it may happen that the input voltage on the input terminal 200b of the differential amplifier 200, which is lower than the actual wheel speed voltage by a predetermined value corresponding to the speed gap V relative to the actual wheel speed as shown in FIG. 6A, exceeds the input voltage on the other input terminal 200 of the differential amplifier 200 at an instant as at $t_6$, whereupon the differential amplifier 200 produces a positive signal to cause a positive pulse voltage to be applied across the resistor 209 of the differential circuit of resistor 209 and capacitor 208 as shown in FIG. 6D. This positive pulse voltage causes current into the base of the transistor 116 to trigger the transistor 116 and cut off the transistor 118, thus triggering the transistor 119 to cause the charging of the capacitor 121 as shown in FIG. 6E. As a result the transistor 120 is triggered to cause the shifting of the reference wheel deceleration from the first preset value of 1.0G into the second preset value of 0.2G as shown in FIG. 6F. The second reference deceleration of 0.2G is re-shifted at a subsequent instant $t_{10}$, at which the reduction signal, having appeared at $t_8$, disappears as mentioned earlier.

Subsequently, if the slip factor S at $t_{10}$ is low with respect to the peak X of the $\mu$-S curve of FIG. 1, the amount of increase of the actual wheel speed voltage during the period from the instant $t_{10}$ till instant $t_{11}$, at which the actual wheel speed turns to decrease, is small. In such a case, the input voltage on the input terminal 200b of the differential amplifier 200 will not exceed the input voltage on the other input terminal 200b, so that the shifting of the reference wheel deceleration from the first preset value of 1.0G into the second preset value of 0.2G is not caused.

Figure 7A:
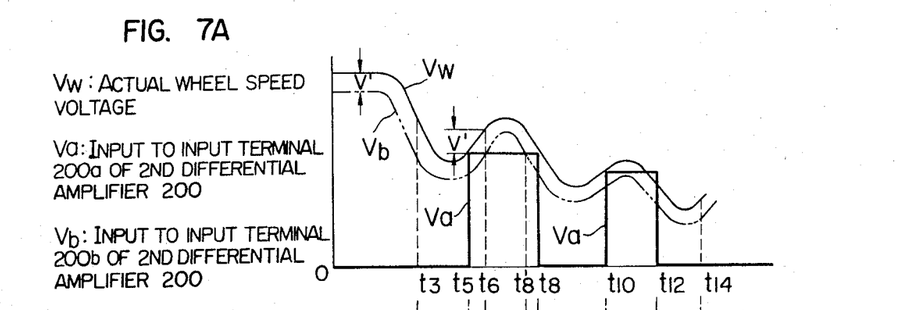
Figure 7B:
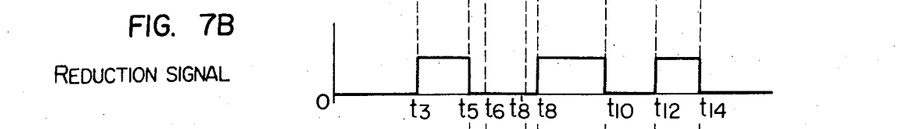
Figure 7C:
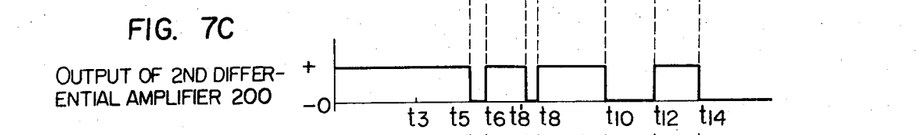

The operation of the second differential amplifier 200 to discriminate the voltage increase with respect to the speed gap V relative to the actual wheel speed $\alpha$ will now be discussed in detail with reference to FIGS. 7A to 7D. In the figures, the abscissa taken from time $t$ is common for all the figures and also for FIGS. 6A to 6F and the ordinate in FIG. 7A represents actual wheel speed voltage Vw (solid curve), input voltage Va (broken curve) on the input terminal 200a of the second differential amplifier 200 and input voltage Vb on the input terminal 200b of the amplifier, in FIG. 7B reduction signal, in FIG. 7C output of the second differential amplifier 200, and in FIG. 7D output of the differential circuit connected to the output terminal of the second differential amplifier 200 and consisting of capacitor 208 and resistor 209.

Figure 7D:
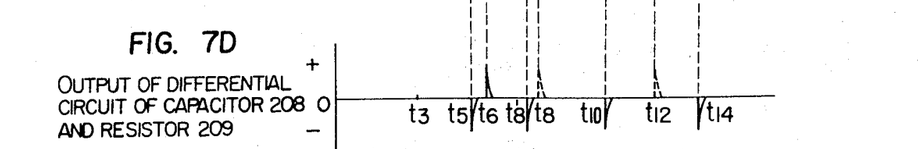

The reduction signal having appeared at $t_3$ disappears at $t_5$ with the recovery of the actual wheel speed. At this instant $t_5$ the differential circuit of capacitor 123 and resistor 124 produces a negative pulse for impression on the base of the transistor 213 to trigger the transistor 213. Concurrently, the transistor 202 is momentarily triggered to charge the capacitor 201, thus registering the actual wheel speed voltage Vw at $t_5$ on the capacitor 201. Thus, input voltage of a value equal to the actual wheel speed voltage $t_5$ appears at the input terminal 200a of the second differential amplifier 200 at that instant as shown in FIG. 7A in FIG. 7. As the input voltage appearing at the input terminal 200a surpasses the input voltage on the input terminal 200b, which is lower than the actual wheel speed voltage Vw by a predetermined value V' corresponding to the speed gap V, the output of the second differential amplifier 200 is changed from a positive level into a negative level. With this change the differential circuit of capacitor 208 and resistor 209 produces a negative pulse signal at $t_5$ as shown in FIG. 7D. With the subsequent increase of the actual wheel speed voltage Vw the input voltage Vb on the input terminal 200 of the amplifier 200 increases. As soon as the input voltage Vb exceeds the input voltage Va on the input terminal 200a, of the amplifier 200 (Va continuous to be substantially equal to the actual wheel speed voltage Vw at $t_5$) at $t_6$, the output of the second differential amplifier 200 is again changed to the positive level. With this change the differential circuit of capacitor 208 and resistor 209 produces a positive pulse to momentarily trigger the transistor 116 as mentioned earlier. Subsequently, it produces a negative pulse at $t_8'$. Thereafter, at $t_8$ it causes the capacitor 201 to be discharged through the transistor 211, reducing the input voltage on the input terminal 200a of the amplifier 200 to the zero potential to render the amplifier 200 ready for the next control cycle. At this time, the output of the second differential amplifier 200 is changed from the negative level into the positive level, causing the differential circuit of capacitor 208 and resistor 209 to produce a positive pulse for impression on the transistor 116, so that the transistor 116 would be triggered at this instant. This malfunctioning of triggering the transistor 116 at this time is avoided by adapting the transistor 212 to be triggered simultaneously with the transistor 211 so as to let the transistor 212 bypass the positive pulse signal from the afore-said differential circuit. This measure is particularly effective when the amount of the previous increase of the actual wheel speed voltage Vw during the afore-said period is small, for example at instant $t_{12}$.

Although the foregoing description has been concerned with some preferred embodiments of the invention, it will of course be understood that the described and illustrated embodiments are by no means limitative, but various changes and modifications in the circuit construction and mode of operation may be made without departing from the scope and spirit of the invention. For example, the invention may be applied to wheels equipped with the brake of a drum type, disc type or any other type. Also, the three-way change-over electromagnetic valve means 70 may be replaced with other mechanisms, for instance the one utilizing a liquid as the driving source. Further, the drive source for the brake torque regulating means 90 is not limited to fluid pressure such as air pressure, but electromagnetic force may be utilized as well.

We claim:

1. An anti-skid system for vehicles including a lock detection device which produces a brake torque reduction signal by detecting whether the wheels are approaching a locked condition and a brake torque regulating means which controls brake torque in response to the output brake torque reduction signal of said lock detection device, said lock detection device comprising:

an actual wheel speed voltage generator means for generating an actual wheel speed voltage corresponding to actual wheel speed;

a reference wheel speed voltage generator means for generating a reference wheel speed voltage corresponding to a reference wheel speed, including means to cause said reference wheel speed voltage to begin discharging from an initial value lower than the value of said actual wheel speed voltage at the instant that the rate of decrease of said actual wheel speed reaches a first reference wheel deceleration, said discharging being a a first time constant corresponding to said first reference wheel deceleration;

a first differential amplifier means for producing said brake torque reduction signal if said reference wheel speed voltage is higher than said actual wheel speed voltage;

detection means for detecting the manner of change of said actual wheel speed subsequent to the termination of the brake torque reduction signal from said first differential amplifier; and a time constant setting means for switching the first time constant for said first reference wheel deceleration into a second time constant for a second reference wheel deceleration of a lower value in response to the output signal of said detection means.

2. An anti-skid system according to claim 1, wherein said detection means includes a delay circuit means for producing a signal a predetermined time after the termination of the brake torque reduction signal and a differential circuit means for detecting whether said actual wheel speed voltage is increasing at the instant of appearance of the signal from said delay circuit means.

3. An anti-skid system according to claim 1, wherein said detection means includes a delay circuit means for producing a signal if the amount of increase in said actual wheel speed voltage subsequent to the termination of the brake torque reduction signal exceeds a predetermined amount.

4. A device for automatically generating a brake force reduction signal in an anti-skid system for use in a wheeled vehicle, said device comprising:

first means for generating a first signal representing actual wheel speed of said vehicle, second means for generating a second signal representing a reference wheel speed, comparison means connected to said first and second means for producing said brake force reduction signal whenever said second signal exceeds said first signal, said second means including:

discharge means for causing said second signal to decrease at a predetermined time constant, detection means for detecting predetermined types of changes in the actual wheel speed subsequent to terminations of the brake force reduction signal, and time constant setting means connected to said discharge means and said detection means for changing said predetermined time constant between at least a first value and second value in dependence upon the detected predetermined type of change to effectively control said second signal such that vehicle wheel slip is automatically maintained near an optimum value corresponding to a maximum coefficient of friction between the vehicle wheels and a roadway surface.

5. A device as in claim 4 wherein said detection means includes means for detecting whether wheel speed is still increasing at a predetermined time after termination of said brake force reduction signal.

6. A device as in claim 4 wherein said detection means includes means for detecting whether the difference between said first and second signals exceeds a predetermined value subsequent to termination of said brake force reduction signal.

7. A device as in claim 4 wherein:

said first means comprises an actual wheel speed voltage generator for generating an actual wheel speed voltage proportional to an actual wheel speed;

said second means comprises a reference wheel speed voltage generator connected in circuit with said actual wheel speed voltage generator, for generating a reference wheel speed voltage, said reference wheel speed voltage comprising an initial voltage lower than said actual wheel speed voltage by a predetermined value, a first reference deceleration voltage not related to said actual wheel speed voltage and a second reference deceleration voltage, said reference wheel speed voltage being switched from said initial voltage to said first reference deceleration voltage at the instant when the rate of decrease of said actual wheel speed exceeds a predetermined value;

said comparison means comprises a differential amplifier connected in circuit with said actual wheel speed voltage generator and said reference wheel speed voltage generator for producing said brake force reduction signal while said reference wheel speed voltage is higher than said actual wheel speed voltage;

said discharge means being connected in circuit with said actual wheel speed voltage generator and said differential amplifier for generating an output signal, said output signal always maintaining said first reference deceleration voltage when the brake force reduction signal from said differential amplifier has been terminated and also switching said first reference deceleration voltage to said second reference deceleration voltage according to the state of increase of said actual wheel speed voltage after the termination of said brake torque reduction signal, said detection means comprising:

an acceleration detecting circuit connected in circuit with said actual wheel speed voltage generator and said differential amplifier, for generating a signal when said actual wheel speed voltage continues to increase during a predetermined time after the termination of the brake force reduction signal from said differential amplifier;

a reduction signal detecting circuit connected in circuit with said differential amplifier, for generating a signal during a predetermined time period after the termination of the brake force reduction signal from said differential amplifier;

a logical product circuit connected in circuit with said acceleration detecting circuit and said reduction signal detecting circuit, for producing a signal only when the signal from said acceleration detecting circuit and that from said reduction signal detecting circuit are supplied thereto at the same time;

a reset circuit connected in circuit with said differential amplifier for producing a reset signal when the brake force reduction signal from said differential amplifier is terminated; and said time constant setting means comprises a setter circuit connected in circuit with said logical product circuit and said reset circuit, for generating said output signal which functions to maintain said first reference deceleration voltage and then to switch said first reference deceleration voltage to said second reference deceleration voltage.

References Cited

UNITED STATES PATENTS

| | | | |
|---|---|---|---|
| 3,498,682 | 3/1970 | Mueller et al. | 303—21 BE |
| 3,547,501 | 12/1970 | Harned et al. | 303—21 BE |
| 3,578,819 | 5/1971 | Atkins | 303—21 P UX |
| 3,583,773 | 6/1971 | Steinbrenner et al. | 303—21 EB |
| 3,586,387 | 6/1971 | Riordan et al. | 303—21 BE UX |

FOREIGN PATENTS

| | | | |
|---|---|---|---|
| 1,810,163 | 11/1968 | Germany | 303—21 BE |

MILTON BUCHLER, Primary Examiner

S. G. KUNIN, Assistant Examiner

U.S. Cl. X.R.

188—181 C; 303—21 F